(12) United States Patent
Kawana et al.

(10) Patent No.: US 9,703,599 B2
(45) Date of Patent: Jul. 11, 2017

(54) ASSIGNMENT CONTROL METHOD, SYSTEM, AND RECORDING MEDIUM

(71) Applicant: FUJITSU LIMITED, Kawasaki-shi, Kanagawa (JP)

(72) Inventors: Kenji Kawana, Numazu (JP); Makoto Nohara, Fuji (JP); Mitsuru Kodama, Numazu (JP); Kiyoshi Yoshizawa, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/823,134

(22) Filed: Aug. 11, 2015

(65) Prior Publication Data

US 2016/0048463 A1 Feb. 18, 2016

(30) Foreign Application Priority Data

Aug. 14, 2014 (JP) ................ 2014-165333

(51) Int. Cl.
*G06F 12/14* (2006.01)
*G06F 9/48* (2006.01)
*G06F 9/50* (2006.01)

(52) U.S. Cl.
CPC .......... *G06F 9/4881* (2013.01); *G06F 9/5033* (2013.01); *G06F 12/1458* (2013.01); *G06F 2212/1052* (2013.01)

(58) Field of Classification Search
CPC ............... G06F 12/0806; G06F 12/084; G06F 12/0842; G06F 12/0844; G06F 12/0848; G06F 12/0871; G06F 12/1458; G06F 9/4881; G06F 2212/1052; G06F 9/5033
See application file for complete search history.

(56) References Cited

U.S. PATENT DOCUMENTS

| | | | |
|---|---|---|---|
| 8,244,982 B2* | 8/2012 | Wolfe | G06F 12/084 711/128 |
| 9,292,359 B2* | 3/2016 | Hudson | G06F 9/54 711/170 |
| 2008/0244598 A1* | 10/2008 | Tolopka | G06F 9/5077 718/104 |

(Continued)

FOREIGN PATENT DOCUMENTS

| | | |
|---|---|---|
| JP | 06-259395 | 9/1994 |
| WO | WO 2011/161774 A1 | 12/2011 |

*Primary Examiner* — Hiep Nguyen
(74) *Attorney, Agent, or Firm* — Oblon, McClelland, Maier & Neustadt, L.L.P.

(57) ABSTRACT

An assignment control method including: assigning, by circuitry, a processor core among a plurality of processor cores to a thread in accordance with receiving an instruction for starting a process for the thread; identifying, by the circuitry, address information of memory area, with which the processor core assigned to the thread accesses, based on identification information identifying the processor core assigned to the thread and associating information stored in a storage unit, the associating information associating identification information of the plurality of processor cores with address information of different memory areas each of which corresponds to one of the plurality of processor cores executing the process of the thread; and controlling, by the circuitry, the processor core assigned to the thread to access corresponding memory area using the identified address information.

7 Claims, 12 Drawing Sheets

(56) References Cited

U.S. PATENT DOCUMENTS

| | | | |
|---|---|---|---|
| 2010/0077185 A1* | 3/2010 | Gopalan | G06F 9/5033 |
| | | | 712/220 |
| 2010/0268891 A1* | 10/2010 | Conte | G06F 9/3804 |
| | | | 711/130 |
| 2012/0197868 A1* | 8/2012 | Fauser | G06F 17/30286 |
| | | | 707/714 |
| 2013/0111158 A1 | 5/2013 | Suzuki et al. | |
| 2014/0143788 A1* | 5/2014 | Kurihara | G06F 9/5044 |
| | | | 718/104 |
| 2014/0173211 A1* | 6/2014 | Loh | G06F 12/0842 |
| | | | 711/129 |
| 2014/0201452 A1* | 7/2014 | Meredith | G06F 12/128 |
| | | | 711/130 |
| 2015/0127912 A1* | 5/2015 | Solihin | G06F 12/08 |
| | | | 711/125 |

\* cited by examiner

| CPU CORE NUMBER | STORAGE DESTINATION ADDRESS |
|---|---|
| 0 | ADDRESS OF CORE #0 INFORMATION |
| 1 | ADDRESS OF CORE #1 INFORMATION |
| ⋮ | ⋮ |

ASSIGNMENT CONTROL METHOD, SYSTEM, AND RECORDING MEDIUM

CROSS-REFERENCE TO RELATED APPLICATION

This application is based upon and claims the benefit of priority of the prior Japanese Patent Application No. 2014-165333, filed on Aug. 14, 2014, the entire contents of which are incorporated herein by reference.

FIELD

The embodiment discussed herein is related to an assignment control method, a system, and a recording medium.

BACKGROUND

In operations of an information processing device including a plurality of central processing unit (CPU) cores, when the plurality of CPU cores refer to the same memory area, snooping occurs. This causes a decrease in processing performance. The term "CPU core" as used here refers to a CPU itself when one core is included in the CPU, and refers to each core when a plurality of cores are included in a CPU. The term "snooping" is a process for maintaining the coherence among cache memories when a plurality of CPU cores access the same memory, and is referred to also as cache coherence.

Figure 10:
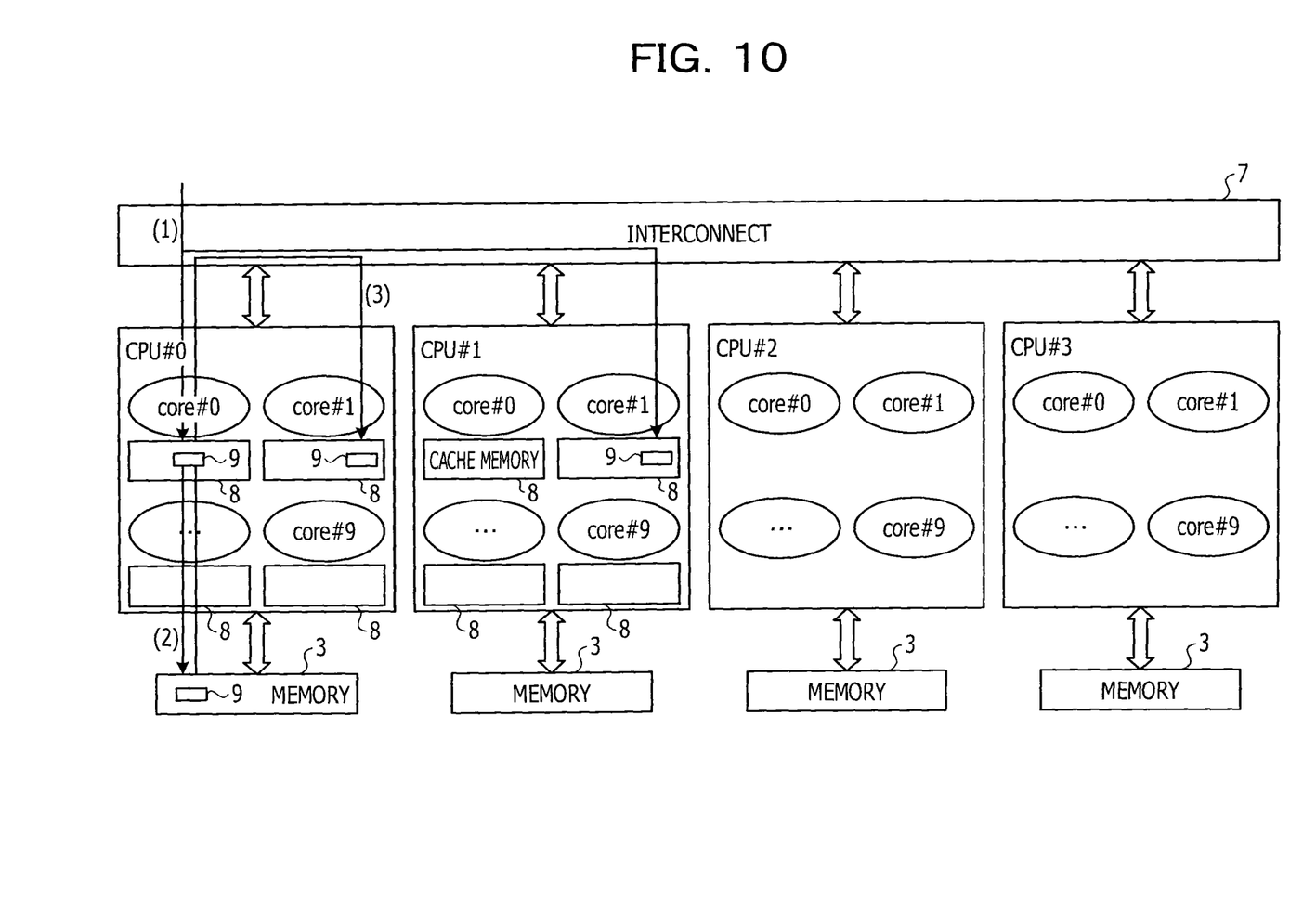
FIG. 10 is a diagram for explaining snooping.

FIG. 10 is a diagram for explaining snooping. FIG. 10 illustrates the case where four CPUs (CPU #0 to CPU #3) each including 10 CPU cores denoted by core #0 to core #9 are coupled via an interconnect 7. It is assumed that each CPU core accesses the same area 9 in a memory 3, and the area 9 is cached by core #0 and core #1 of CPU #0 and core #1 of CPU #1.

Once core #0 of CPU #0 writes data to the area 9 in the cache memory 8, core #0 of CPU #0 notifies other CPU cores of an address of the area 9 at which the data is written (1). Then, the other CPU cores, having received the notification, invalidate data if the address of which the other CPU cores have been notified is cached, and core #0 of CPU #0 updates the area 9 of the memory 3 with rewritten data (2). Then, when data of the area 9 has to be used, the other CPU cores read data of the area 9 from the memory 3 (3).

A sequence of processes (1) to (3) performed in such a way in order to maintain coherence among cache memories 8 as data is written to the cache memory 8 is referred to as snooping.

Figure 11:
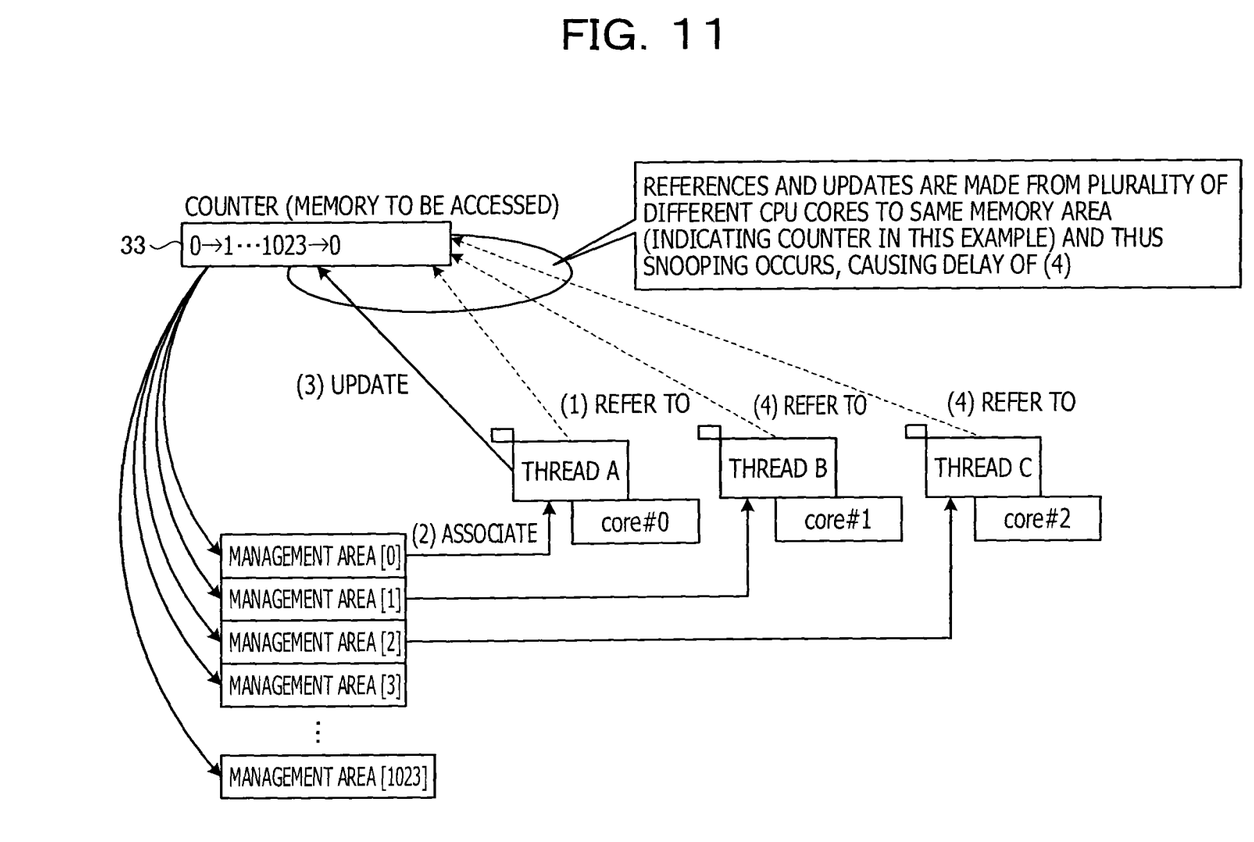
FIG. 11 illustrates a processing instance in which snooping occurs.

FIG. 11 is a diagram illustrating a processing instance in which snooping occurs. In FIG. 11, a thread A run on core #0, a thread B run on core #1, a thread C run on core #2, and the like use management area [0] to management area [1023] in a distributed manner. Here, a thread is a unit of processing that uses a CPU core, and is the smallest unit of execution of a program on an operating system (OS) that supports parallel processing. A counter 33 is an index for using management area [0] to management area [1023] in a distributed manner and is initialized to "0".

In the example illustrated in FIG. 11, first, the thread A refers to the counter 33 (1) and, according to the value of the counter 33, the thread A is associated with a management area that the thread A uses (2). Here, the value of the counter 33 is "0", and therefore the thread A is associated with management area [0].

Next, the thread A updates the counter 33 from [0] to [1] for the sake of the next thread B (3). Then, the thread B refers to the counter 33 (4) and, based on the value of the counter 33, the thread B is associated with a management area that the thread B uses.

In this example, references and updates are made from different CPU cores on which different threads run, to the counter 33, which is the same memory area, and thus snooping occurs. This results in a delay in reference processing denoted by (4).

Figure 12:
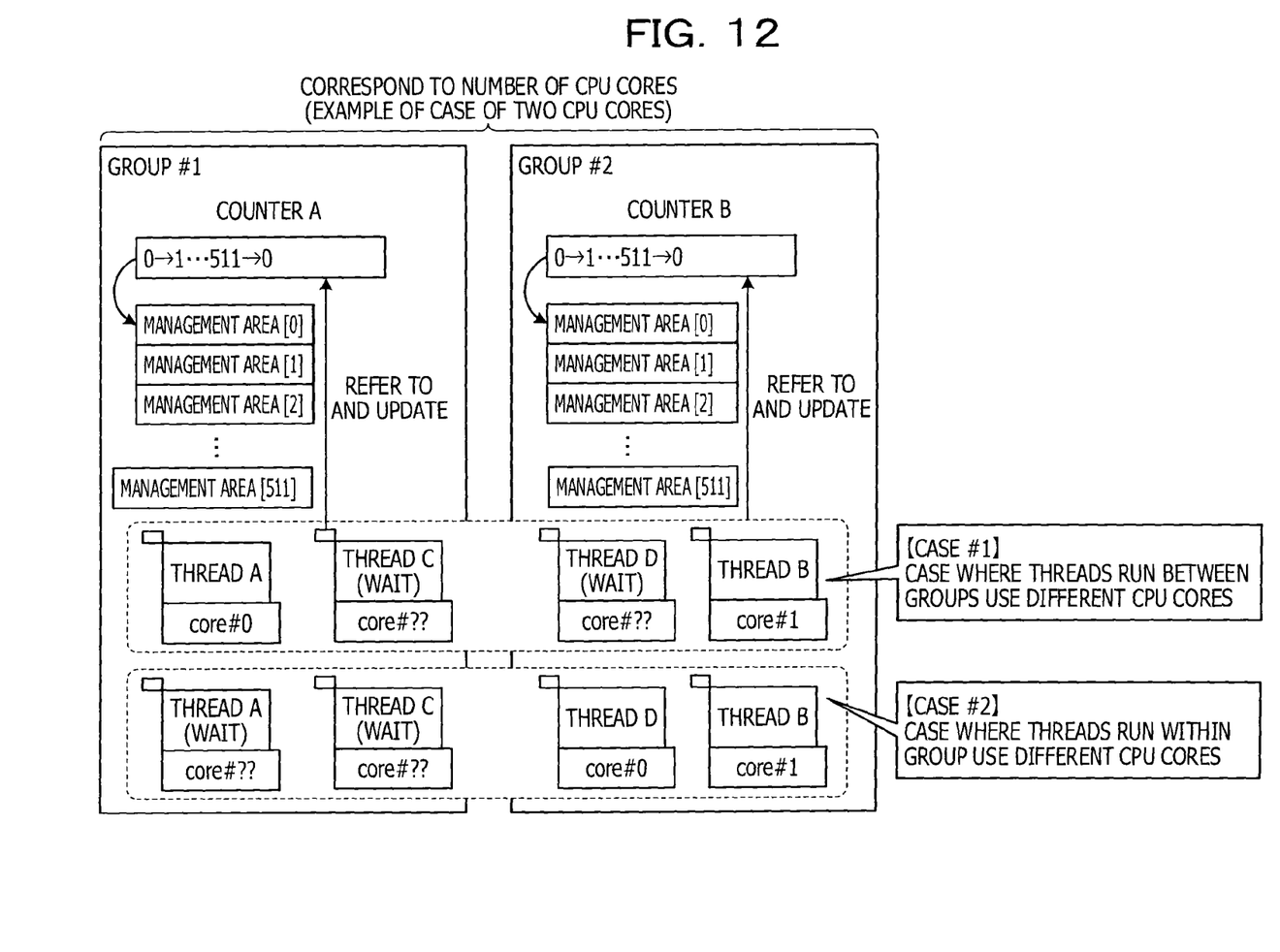
FIG. 12 illustrates an existing example of dealing with snooping.

Therefore, the same memory areas to which writing is made from different CPU cores are prepared such that the number of memory areas corresponds to the number of CPU cores. Furthermore, threads are divided into groups, so that access to the same memory area is dispersed. Thus, snooping is reduced. FIG. 12 is a diagram illustrating an existing example of dealing with snooping. FIG. 12 illustrates the case where there are two CPU cores, and threads are divided into two groups, a group #1 and a group #2. An operating system (OS) dispatches a thread to an available CPU core so as to run the thread. Consequently, in the example of FIG. 12, the CPU on which a thread that manipulates the counter runs is variable.

In FIG. 12, a thread included in group #1 accesses a counter A and uses management area [0] to management area [511] for group #1. A thread included in group #2 accesses a counter B and uses management area [0] to management area [511] for group #2. In this way, threads are divided into two groups so as to reduce by half the number of accesses made to the same memory area. This may reduce snooping.

Note that there is a related-art technique in which, when threads have access to the same data, it is determined that output data of a thread X is input data of a thread Y, and data is written to a cache of a CPU on which the thread Y runs, so that snooping is inhibited. There is another related-art technique in which the amount of bus traffic of CPUs is monitored, and movement of a process between processors is suppressed when the amount of bus traffic exceeds a threshold, so that snooping is inhibited.

Examples of the related art techniques include International Publication Pamphlet No. WO 2011/161774 and Japanese Laid-open Patent Publication No. 6-259395.

In a related-art technique illustrated in FIG. 12, in case #1 where the thread A included in group #1 is run on core #0, and the thread B included in group #2 is run on core #1, no snooping occurs. In contrast, in case #2 where a thread D included in group #2 is run on core #0, and the thread B included in the same group #2 as the thread D is run on core #1, the two threads have access to the counter B, thereby causing snooping.

Since the OS dispatches threads to vacant CPU cores so as to run the thread, both case #1 and case #2 may occur. Accordingly, with the related-art technique illustrated in FIG. 12, there are some cases in which, even though the number of occurrences of snooping may be reduced, it is impossible to inhibit snooping.

SUMMARY

According to an aspect of the invention, an assignment control method including: assigning, by circuitry, a processor core among a plurality of processor cores to a thread in accordance with receiving an instruction for starting a process for the thread; identifying, by the circuitry, address information of memory area, with which the processor core assigned to the thread accesses, based on identification information identifying the processor core assigned to the thread and associating information stored in a storage unit, the associating information associating identification information of the plurality of processor cores with address information of different memory areas each of which corresponds to one of the plurality of processor cores executing the process of the thread; and controlling, by the circuitry, the processor core assigned to the thread to access corresponding memory area using the identified address information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Hereinafter, an embodiment of an assignment control program, an assignment control method, and an assignment control device disclosed in the present application will be described in detail with reference to the accompanying drawings. According to one aspect of the disclosed embodiment, snooping may be inhibited. It is to be noted that this embodiment is not intended to limit the techniques disclosed herein.

Embodiment

Figure 1:
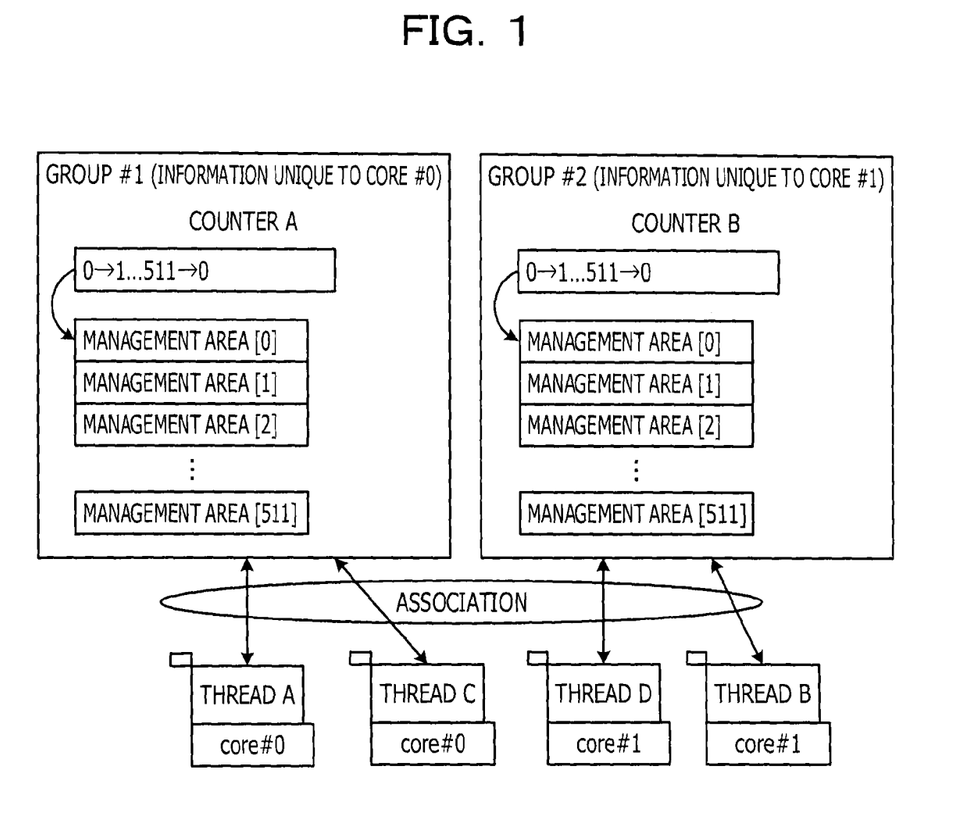
FIG. 1 is a diagram for explaining association between CPU cores and counters performed by an OS according to an embodiment.

First, association between CPU cores and counters performed by an OP according to the embodiment will be described. Here, the counter is an example of the same memory area to which writing is made from different CPU cores. FIG. 1 is a diagram for explaining association between CPU cores and counters performed by the OS according to the embodiment. FIG. 1 illustrates the case where the number of CPU cores, that is, the number of groups is two.

As illustrated in FIG. 1, the OS according to the embodiment associates core #0 with group #1, and core #1 with group #2. That is, when a thread A and a thread C are run on core #0, the OS according to the embodiment dynamically associates the thread A and the thread C with group #1, thus causing the thread A and the thread C to use the counter A. When the thread D and the thread B are run on core #1, the OS according to the embodiment dynamically associates the thread D and the thread B with group #2, thus causing the thread D and the thread B to use the counter B.

In this way, the OS according to the embodiment dynamically associates a counter with threads. That is, the OS according to the embodiment dynamically associates information unique to a CPU core with threads.

Figure 2:
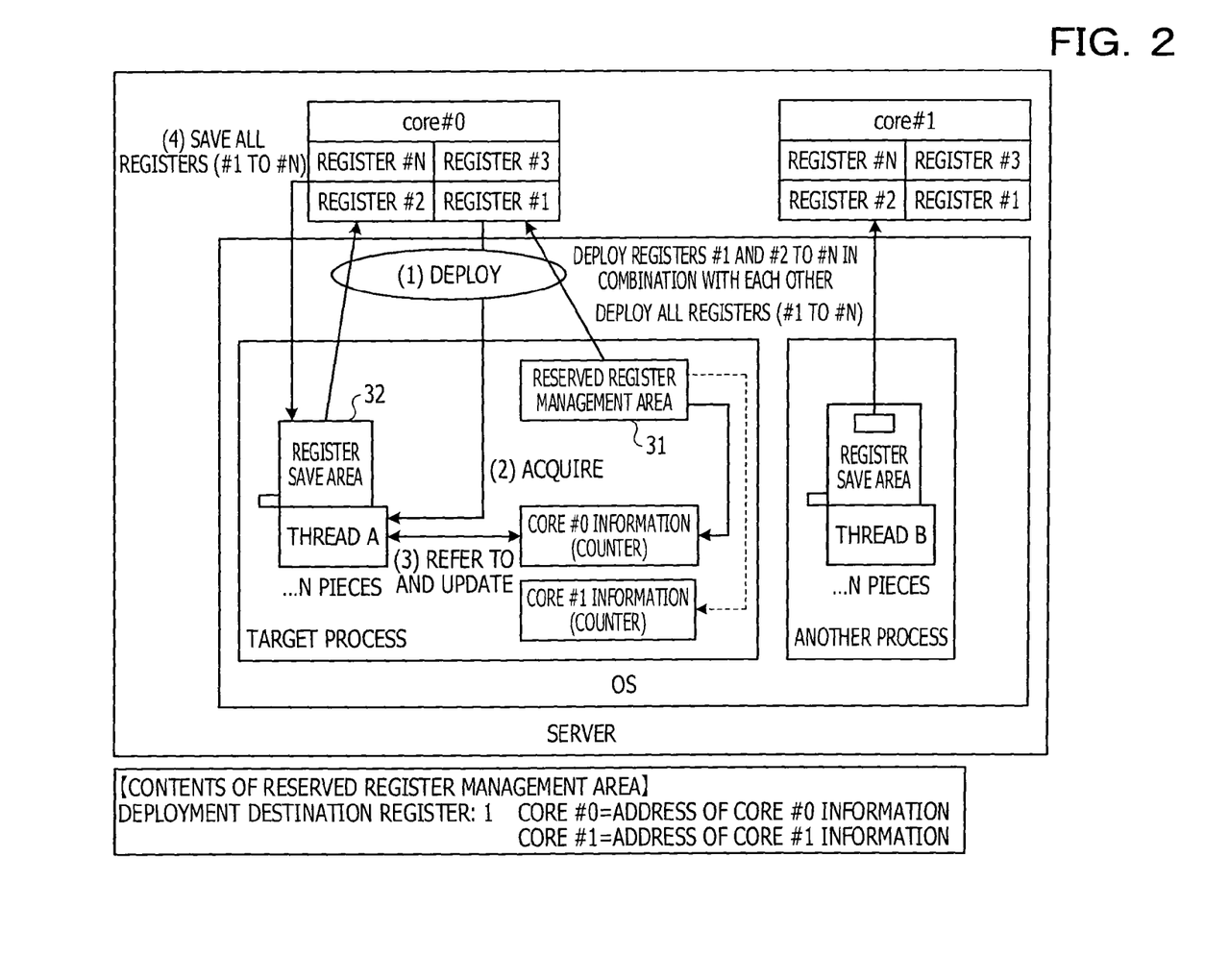
FIG. 2 is a diagram for explaining a setup in which the OS according to the embodiment dynamically associates information unique to CPU cores and threads.

FIG. 2 is a diagram for explaining a setup in which the OS according to the embodiment dynamically associates information unique to a CPU core with threads. The OS according to the embodiment makes use of a register for dynamically associating information unique to a CPU core with threads. Register #1 is used in FIG. 2; however, another register may be used.

Typically, all register information saved in a thread is deployed to a register, and thus the thread is enabled to run. Accordingly, at the time of deploying saved register information when the thread starts to run, the OS according to the embodiment stores, in register #1, the address of information unique to a CPU core to which the thread is assigned, enabling the thread to access the information unique to the CPU core.

For this purpose, the OS according to the embodiment provides a reserved register management area 31 in a process. The reserved register management area 31 is an area for managing information unique to a CPU core, and stores the number of a register serving as the deployment destination and the address of information unique to each CPU core. Here, the deployment destination register is a register in which the addresses of information unique to CPU cores are stored.

For example, in FIG. 2, the reserved register management area 31 stores "1" as the number of the deployment destination register, stores the address of core #0 information associated with core #0, and stores the address of core #1 information associated with core #1. Here, the core #0 information is information unique to core #0, and the core #1 information is information unique to core #1.

When a thread starts to run, the OS according to the embodiment acquires the address of information unique to a CPU core to which the thread is assigned, from the reserved register management area 31 and combines the acquired address with information of register #2 to register #N stored in a register save area 32. Then, the OS according to the embodiment deploys the combined information to register #1 to register #N (1).

In FIG. 2, when the thread A is run on core #0, the address of the core #0 information is extracted from the reserved register management area 31 and is stored in register #1. The respective pieces of information of register #2 to register #N are extracted from the register save area 32 and are stored in register #2 to register #N, respectively.

Note that, in the case where information to be stored in register #1 is not present in the reserved register management area 31, the OS according to the embodiment registers, in the reserved register management area 31, the address of information unique to a CPU core assigned to a thread such that the address is associated with the CPU core, and then stores the address in register #1. The case where information to be stored in register #1 is not present in the reserved register management area 31 is a case where a CPU is added and a CPU core is used for the first time.

The thread A acquires, from register #1, the address of the core #0 information assigned to the thread (2) and refers to and updates the core #0 information (3). Subsequently, when the thread running on core #0 is switched to another thread, the OS according to the embodiment stores information of register #1 to register #N in the register save area 32 (4). Although information of register #1 does not have to be saved in the register save area 32, register #1 to register #N are collectively stored in the register save area 32 in one instruction, and therefore information of register #1 is also stored in the register save area 32.

In this way, the OS according to the embodiment stores, in the deployment destination register, the address of information unique to a CPU core to which a thread is assigned, and thus enables the thread to access the information unique to the CPU core. Accordingly, the OS according to the embodiment may dynamically associate information unique to a CPU core assigned to a thread, with the thread, and the thread is enabled to access the information unique to the CPU core to which the thread is assigned. Accordingly, the OS according to the embodiment may inhibit threads running on different CPU cores from accessing the same memory area and may inhibit snooping.

Figure 3:
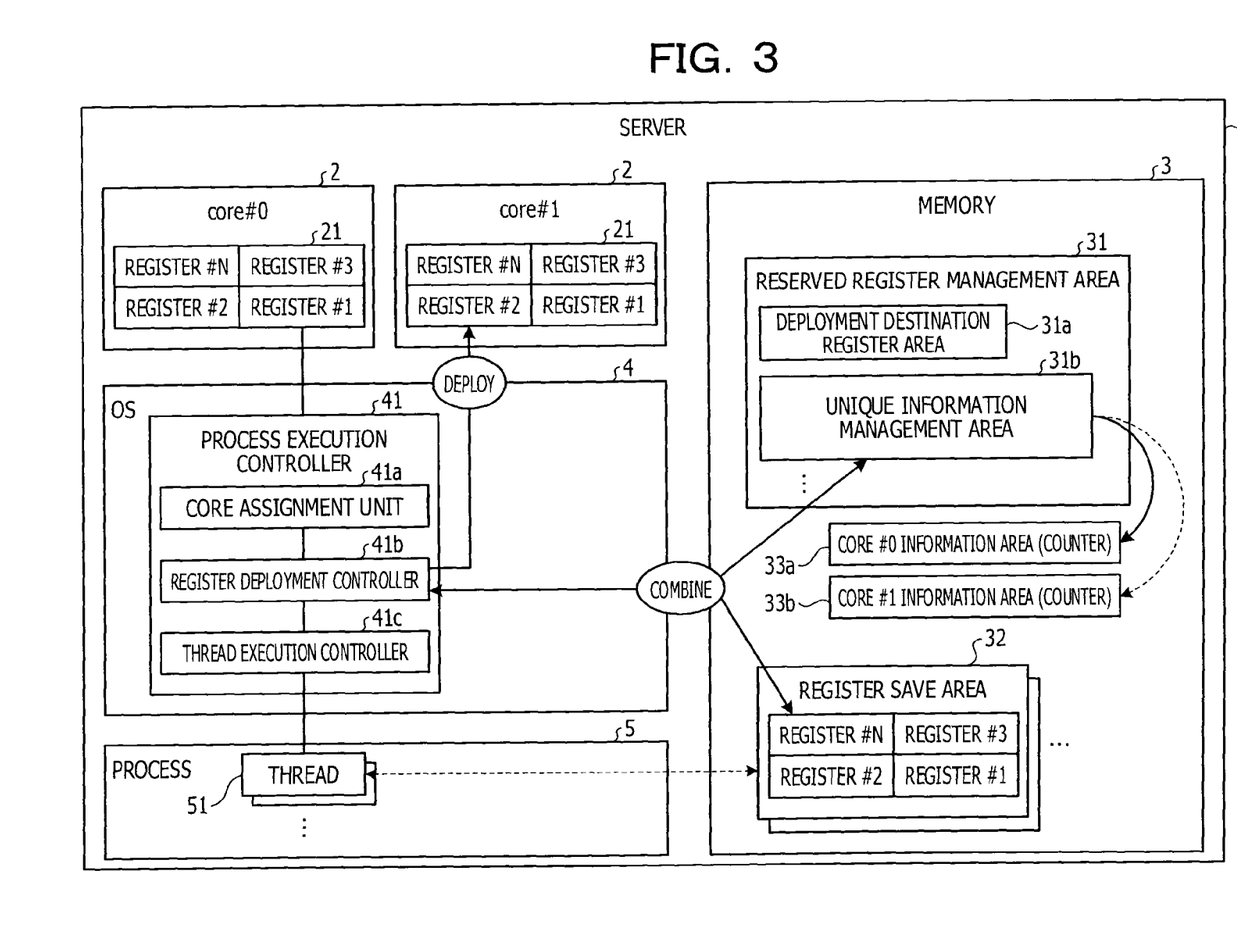
FIG. 3 illustrates a configuration of a server according to the embodiment.

Next, a configuration of a server according to the embodiment will be described. FIG. 3 is a diagram illustrating a configuration of a server according to the embodiment. As illustrated in FIG. 3, a server 1 includes two CPU cores 2 denoted by core #0 and core #1 and a memory 3. Note that although only two CPU cores are illustrated here for the sake of explanatory convenience, the server 1 may include three or more CPU cores 2. The server 1 may include a plurality of CPUs, and each CPU may include a plurality of CPU cores 2.

The CPU core 2 is a processing unit that executes threads, and includes N registers 21 denoted by register #1 to register #N. The memory 3 is a random access memory (RAM) that stores information used by the CPU cores 2, programs executed on the CPU cores 2, and the like. The memory 3 includes a reserved register management area 31, a register save area 32, a core #0 information area 33a, and a core #1 information area 33b.

The reserved register management area 31 is an area for managing information unique to the CPU cores 2 and includes a deployment destination register area 31a and a unique information management area 31b. The deployment destination register area 31a stores the number of a register to which the address of information unique to a CPU core is deployed. The unique information management area 31b stores the identifier of the CPU core 2 and the address of information unique to the CPU core in association with each CPU core 2.

Figure 4:
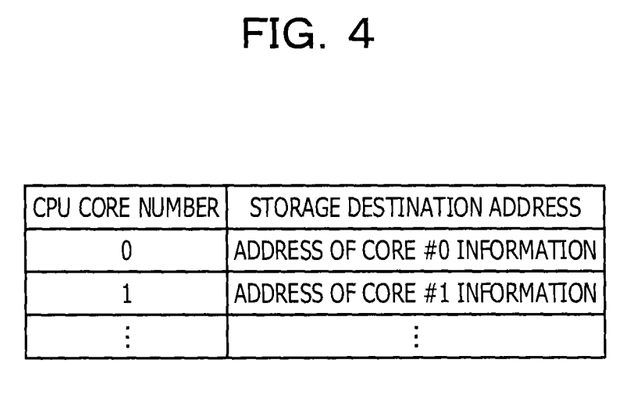
FIG. 4 depicts an example of a unique information management area.

FIG. 4 is a diagram depicting an example of the unique information management area 31b. As depicted in FIG. 4, the unique information management area 31b stores a CPU core number and a storage destination address in association with each CPU core 2. The CPU core number is a number identifying the CPU core 2. The storage destination address is an address of a storage destination of information unique to a CPU core. For example, with regard to core #0, a CPU core number "0" and the address of the core #0 information area 33a are stored in association with core #0.

The register save area 32 is an area in which, when execution of the thread 51 is interrupted, information of register #1 to register #N is saved. The register save area 32 is associated with the thread 51.

The core #0 information area 33a is an area in which the core #0 information, which is information unique to core #0, is stored. The core #1 information area 33b is an area in which the core #1 information, which is information unique to core #1, is stored.

On the CPU core 2, an OS 4 is executed, and a process 5 is executed under management of the OS 4. The OS 4 implements a process execution controller 41 by executing, on the CPU core 2, a process execution control program that controls execution of the process 5. The process execution controller 41 includes a core assignment unit 41a, a register deployment controller 41b, and a thread execution controller 41c. The core assignment unit 41a assigns the CPU cores 2 to the threads 51.

The register deployment controller 41b controls register deployment so that the addresses of information unique to the CPU cores 2 assigned to the threads 51 are stored in register #1, in order to enable the information unique to the CPU cores 2 assigned to the threads 51 to be accessed from the threads 51. Specifically, the register deployment controller 41b combines addresses of information unique to the CPU cores 2 assigned to the threads 51, with information of registers #2 to #N of the register save area 32 and deploys the combined addresses and information to registers #1 to #N of the CPU cores 2 assigned to the threads 51.

During startup of the process 5, the register deployment controller 41b also acquires the reserved register management area 31, determines a deployment destination register, and registers the CPU cores 2 and a deployment destination register in the reserved register management area 31. Note that the deployment destination register may be fixed to, for example, the register #1.

The thread execution controller 41c controls execution of the thread 51. For example, the thread execution controller 41c saves, to the register save area 32, information of register #1 to register #N used for the thread 51 during switching of the thread 51.

Figure 5:
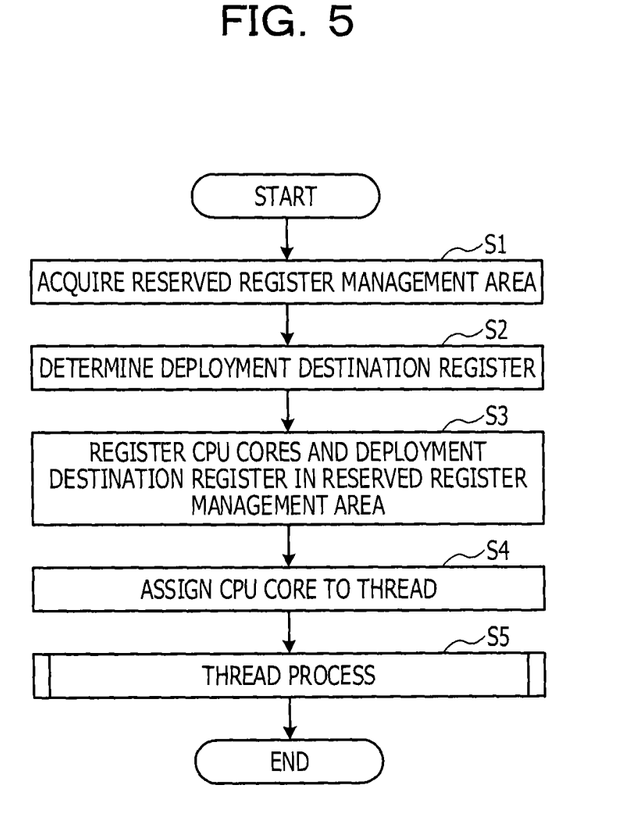
FIG. 5 is flowchart illustrating a flow of process execution control.

Next, the flow of process execution control will be described. FIG. 5 is flowchart illustrating a flow of process execution control. As illustrated in FIG. 5, during startup of the process 5, the register deployment controller 41b acquires the reserved register management area 31 (step S1).

Then, the register deployment controller 41b determines a deployment destination register (step S2) and registers the CPU cores 2 and the deployment destination register in the reserved register management area 31 (step S3). Note that although a deployment destination register is determined for each process here, the deployment destination register may be uniquely determined by the OS.

Subsequently, once the thread 51 is created in the middle of processing of the process 5, the core assignment unit 41a assigns the CPU core 2 to the thread 51 (step S4), and the thread execution controller 41c performs thread processing for executing a thread (step S5).

In such a way, the register deployment controller 41b registers the CPU cores 2 and the deployment destination register in the reserved register management area 31 during startup of the process 5, and thereby may prepare for register deployment.

Figure 6:
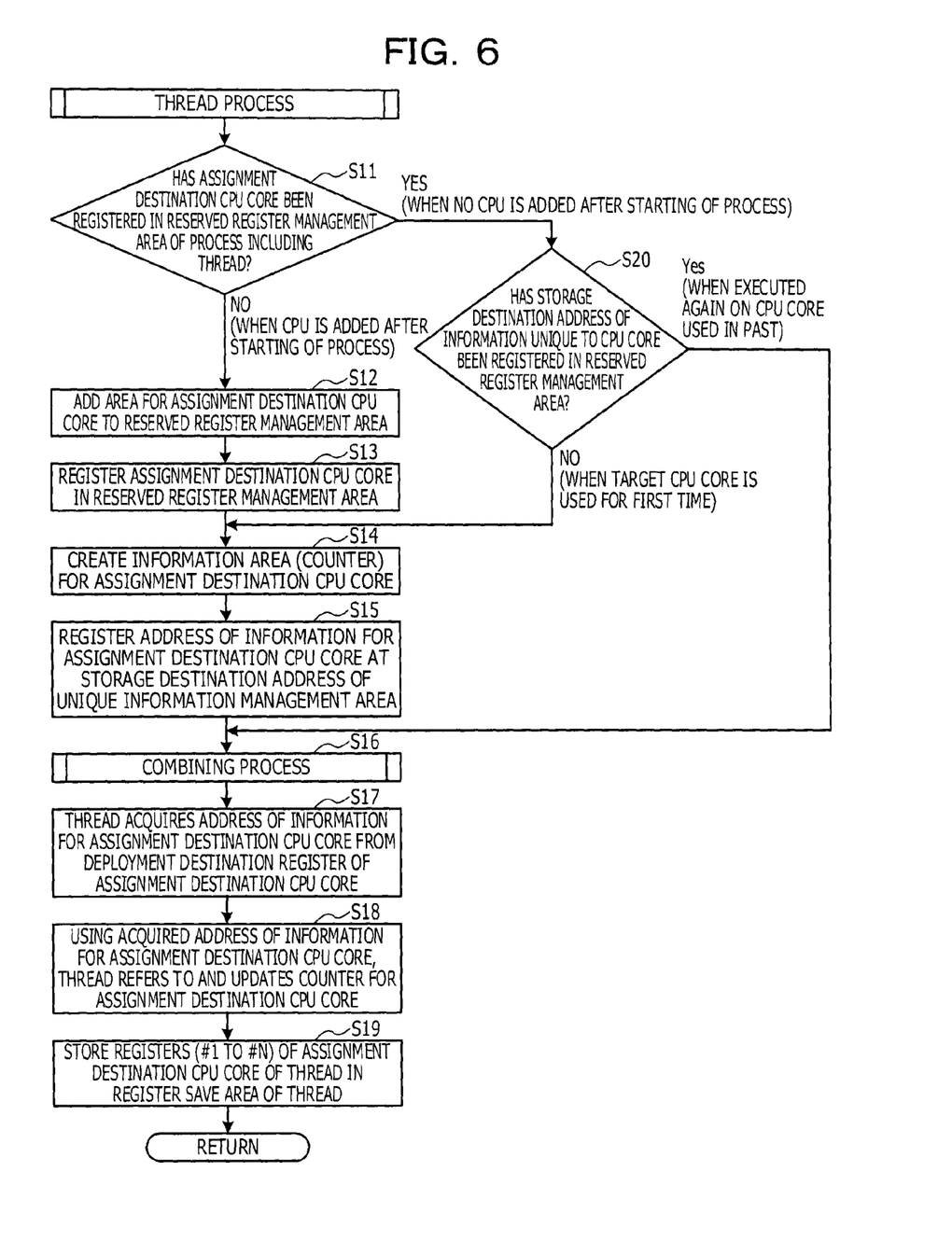
FIG. 6 is a flowchart illustrating a flow of a thread process.

Next, the flow of a thread process will be described. FIG. 6 is a flowchart illustrating a flow of a thread process. As illustrated in FIG. 6, during startup of a thread process, the register deployment controller 41b determines whether or not an assignment destination CPU core 2 has been registered in the reserved register management area 31 of the process 5 including the thread 51 (step S11). Here, the assignment destination CPU core 2 is the CPU core 2 assigned to the thread 51.

As a result, if the assignment destination CPU core 2 has not been registered, which is the case when a CPU is added after startup of the process, the register deployment controller 41b adds an area for an assignment destination CPU core to the reserved register management area 31 (step S12). Then, the register deployment controller 41b registers the assignment destination CPU core 2 in the reserved register management area 31 (step S13).

Then, once the thread 51 creates an information area for an assignment destination CPU core, that is, a counter (step S14), the register deployment controller 41b registers the address of information for the assignment destination CPU core at the storage destination address of the unique information management area 31b (step S15). Then, the register deployment controller 41b performs a combining process in which information of the reserved register management area 31 and information of the register save area 32 are deployed in combination with each other in register 1 to register #N (step S16).

Then, the thread 51 acquires the address of information for an assignment destination CPU core from a deployment destination register of the assignment destination CPU core 2 (step S17). Then, using the acquired address of the information for an assignment destination CPU core, the thread 51 refers to and updates the counter for an assignment destination CPU core (step S18). Then, the thread execution controller 41c stores register #1 to register #N of the assignment destination CPU core 2 of the thread 51 in the register save area 32 of the thread 51 (step S19) and completes the thread process.

If the assignment destination CPU core has been registered in the reserved register management area 31 (Yes in step S11), the register deployment controller 41b determines whether the storage destination address of information unique to the CPU core has been registered in the reserved register management area 31 (step S20). Here, the case where the assignment destination CPU core has been registered in the reserved register management area 31 is a case when no CPU is added after startup of the process.

Then, if the storage destination address of information unique to a CPU core has been registered in the reserved register management area 31, the thread execution controller 41c proceeds to step S16, and, if not, proceeds to step S14.

In such a way, the register deployment controller 41b deploys the address of information unique to the assignment destination CPU core 2 in the deployment destination register. This enables the thread 51 to access information unique to the assignment destination CPU core 2.

Figure 7:
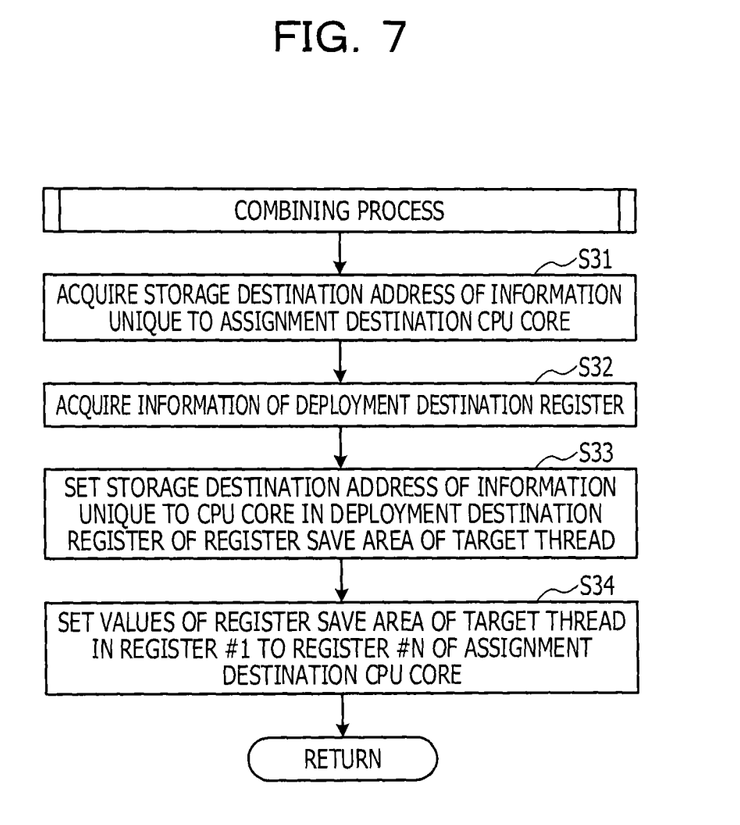
FIG. 7 is a flowchart illustrating a flow of a combining process.

Next, the flow of the combining process will be described. FIG. 7 is a flowchart illustrating a flow of a combining process. As illustrated in FIG. 7, the register deployment controller 41b acquires the storage destination address of information unique to the assignment destination CPU core 2 from the reserved register management area 31 (step S31). Then, the register deployment controller 41b acquires information of the deployment destination register from the reserved register management area 31 (step S32).

Then, the register deployment controller 41b sets the storage destination address of information unique to the assignment destination CPU core 2 in the deployment destination register of the register save area 32 of the target thread 51 (step S33). Then, the register deployment controller 41b sets the values of the register save area 32 of the target thread 51 in register #1 to register #N of the assignment destination CPU core 2 (step S34).

In such a way, the register deployment controller 41b sets the address of a storage destination of information unique to the assignment destination CPU core 2 in the deployment destination register. This enables the thread 51 to access the information unique to the assignment destination CPU core 2.

Figure 8A:
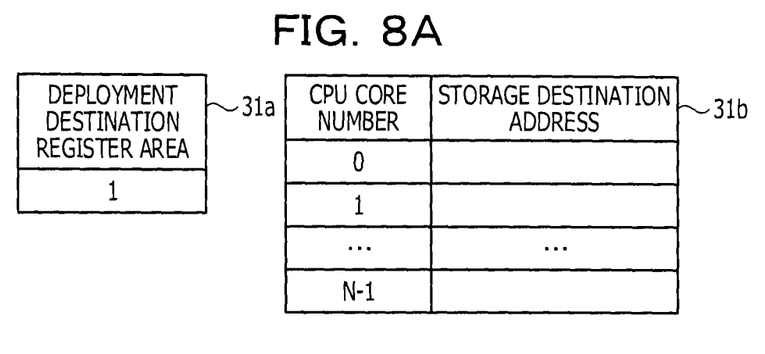
FIG. 8A depicts an example of a reserved register management area during startup of a process.
Figure 8B:
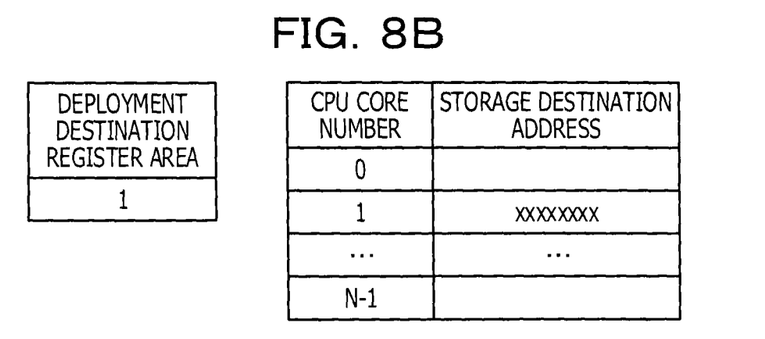
FIG. 8B depicts an example of the reserved register management area when CPU cores are assigned to threads.
Figure 8C:
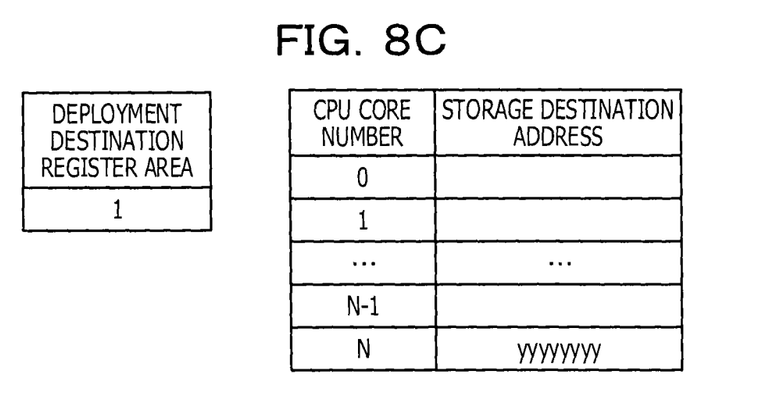
FIG. 8C depicts an example of the reserved register management area when CPU cores are assigned to threads.

Next, an example of the reserved register management area 31 will be described. FIG. 8A is a diagram depicting an example of the reserved register management area 31 during startup of a process, and FIG. 8B and FIG. 8C are diagrams depicting examples of the reserved register management area 31 when the CPU cores 2 are assigned to the threads 51. FIG. 8B depicts a case where core #1 is assigned to the thread 51, and FIG. 8C depicts a case where a CPU is added after startup of a process and the added core #N is assigned to the thread 51.

FIG. 8A depicts an example of a reserved register management area during startup of a process in the case where the deployment destination register is register #1 and the number of CPU cores 2 is N. As depicted in FIG. 8A, during startup of a process, "1" is stored in the deployment destination register area 31a and "0" to "N−1" are registered for CPU core numbers of the unique information management area 31b.

As depicted in FIG. 8B, in the case where core #1 is assigned to the thread 51, "xxxxxxxx" is registered as a storage destination address corresponding to the CPU core number "1" in the unique information management area 31b. As depicted in FIG. 8C, in the case where a CPU is added after startup of a process and the added core #N is assigned to the thread 51, "yyyyyyyy" is registered as a storage destination address corresponding to a CPU core number "N" in the unique information management area 31b.

As described above, in the embodiment, the reserved register management area 31 includes the deployment destination register area 31a and the unique information management area 31b. The deployment destination register area 31a stores the number of a deployment destination register. The unique information management area 31b stores storage destination addresses of information unique to the CPU cores 2 in association with the CPU cores 2. The register deployment controller 41b acquires the addresses of information unique to the CPU cores 2 assigned to the threads 51 from the reserved register management area 31 and stores the addresses in the deployment destination register.

Therefore, the thread 51 may access information unique to the CPU core 2 by using the address stored in the deployment destination register. Accordingly, an area accessed by a plurality of the threads 51 is set as an area of information unique to the CPU cores 2, and thereby the OS 4 may inhibit snooping.

Note that although FIG. 3 illustrates that the server 1 includes two CPU cores 2 and the memory 3 as hardware, the server 1 includes other hardware components. Therefore, the hardware configuration of the server 1 will be described.

Figure 9:
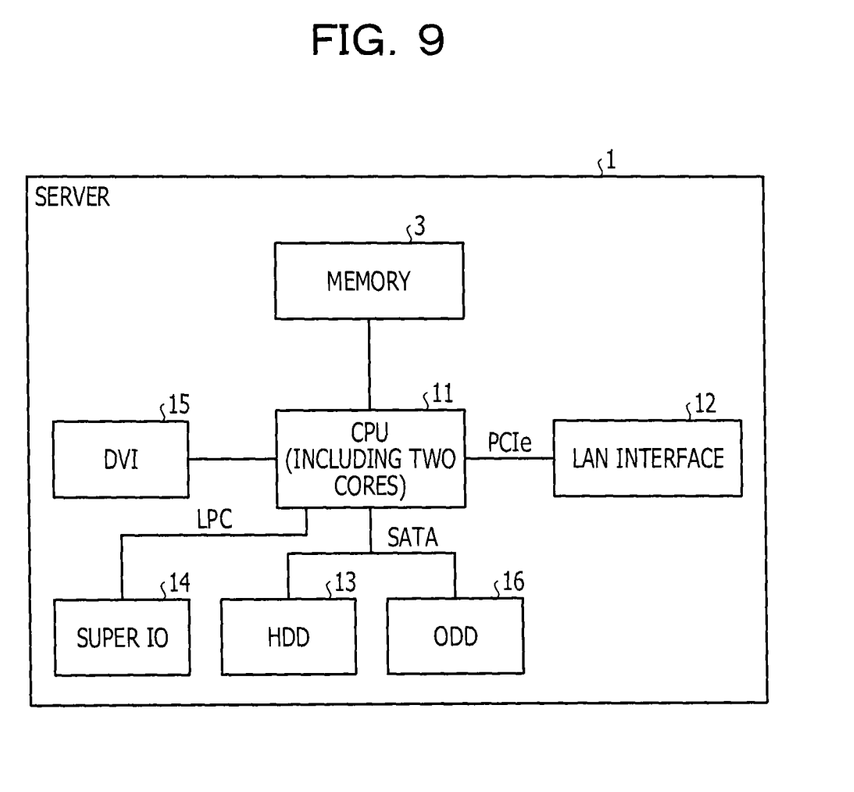
FIG. 9 illustrates a hardware configuration of the server.

FIG. 9 is a diagram illustrating a hardware configuration of the server 1. As illustrated in FIG. 9, the server 1 includes the memory 3, a CPU 11 including two CPU cores 2, a local area network (LAN) interface 12, and a hard disk drive (HDD) 13. The server 1 also includes a super input output (JO) 14, a digital visual interface (DVI) 15, and an optical disk drive (ODD) 16.

The LAN interface 12 is an interface for coupling the server 1 via the LAN to other computers. The HDD 13 is a disk device that stores programs and data, and the super IO 14 is an interface for coupling input devices such as a mouse and a keyboard. The DVI 15 is an interface that couples a liquid crystal display device, and the ODD 16 is a device that performs reading and writing of a digital versatile disk (DVD).

The LAN interface 12 is coupled to the CPU 11 by using PCI express (PCIe), and the HDD 13 and the ODD 16 are coupled to the CPU 11 by using serial advanced technology attachment (SATA). The super IO 14 is coupled to the CPU 11 by using low pin count (LPC).

Programs such as the OS 4 executed on the server 1 are stored in a DVD, are read from the DVD by the ODD 16, and are installed in the server 1. Alternatively, programs such as the OS 4 are stored in a database of another computer system coupled via the LAN interface 12, or the like, are read from the database or the like, and are installed in the server 1. Then, the installed programs such as the OS 4 are stored in the HDD 13, are read into the memory 3, and are executed by the CPU 11.

Furthermore, although, in the embodiment, a counter has been described, by way of example, as information unique to a CPU core, the present disclosure is not limited to this and may be similarly applied to, for example, cases where a structure or the like is information unique to a CPU core.

Furthermore, in the embodiment, the case where the address of a storage area of information unique to a CPU core is stored in a register so as to be able to be accessed from a thread has been described. However, the present disclosure is not limited to this and may be similarly applied to cases where a thread is enabled to access the address through other methods.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An assignment control method comprising:
   assigning, by circuitry, a processor core among a plurality of processor cores to a thread in accordance with receiving an instruction for starting a process for the thread;
   identifying, by the circuitry, address information of a memory area, with which the processor core assigned to the thread accesses, based on identification information identifying the processor core assigned to the thread and association information stored in a memory, the association information associating identification information of the plurality of processor cores with address information of different memory areas each of which corresponds to one of the plurality of processor cores executing a corresponding process of a corresponding thread;
   controlling, by the circuitry, the processor core assigned to the thread to access the memory area using the identified address information;
   deploying, by the circuitry, the address information of the memory area from a reserved register management area of the memory, in combination with register information of a first register from a register save area of the memory, to the first register; and
   controlling, by the circuitry, the processor core assigned to the thread to access the memory area by using the address information of the memory area stored in the first register.

2. The assignment control method according to claim 1, further comprising:
   storing, by the circuitry, the address information of the memory area in a second register; and
   controlling, by the circuitry, the processor core assigned to the thread to acquire the address information of the memory area from the second register.

3. A system comprising:
   a memory configured to store association information associating identification information of a plurality of processor cores with address information of different memory areas each of which corresponds to one of the plurality of processor cores executing a corresponding process of a corresponding thread; and
   circuitry configured to:
   assign a processor core among the plurality of processor cores to a thread in accordance with receiving an instruction for starting a process for the thread;
   identify address information of a memory area, with which the processor core assigned to the thread accesses, based on the association information stored in the memory;
   control the processor core assigned to the thread to access the memory area using the identified address information;
   deploy the address information of the memory area from a reserved register management area of the memory, in combination with register information of a first register from a register save area of the memory, to the first register; and
   control the processor core assigned to the thread to access the memory area by using the address information of the memory area stored in the first register.

4. The system according to claim 3, wherein the circuitry is further configured to:
   store the address information of the memory area in a second register; and
   control the processor core assigned to the thread to acquire the address information of the memory area from the second register.

5. The system according to claim 3, wherein the system further comprises the plurality of processor cores, and the circuitry is configured to assign a plurality of threads to the plurality of processor cores.

6. A non-transitory computer-readable medium storing therein a program that causes a computer to execute a process, the process comprising:
   assigning a processor core among a plurality of processor cores to a thread in accordance with receiving an instruction for starting a process for the thread;
   identifying address information of a memory area, with which the processor core assigned to the thread accesses, based on identification information identifying the processor core assigned to the thread and association information stored in a memory, the association information associating identification information of the plurality of processor cores with address information of different memory areas each of which corresponds to one of the plurality of processor cores executing a corresponding process of a corresponding thread;

controlling the processor core assigned to the thread to access the memory area using the identified address information;

deploying the address information of the memory area from a reserved register management area of the memory, in combination with register information of a first register from a register save area of the memory, to the first register; and controlling the processor core assigned to the thread to access the memory area by using the address information of the memory area stored in the first register.

7. The non-transitory computer-readable medium according to claim 6, wherein the process further comprises:

storing the address information of the memory area in a second register; and controlling the processor core assigned to the thread to acquire the address information of the memory area from the second register.

\* \* \* \* \*